United States Patent [19]

Morrisroe et al.

[11] Patent Number: 4,766,287

[45] Date of Patent: Aug. 23, 1988

[54] INDUCTIVELY COUPLED PLASMA TORCH WITH ADJUSTABLE SAMPLE INJECTOR

[75] Inventors: Peter J. Morrisroe, New Milford; Andrew T. Zander, Brookfield; David C. Manning, Trumbull; Peter H. Gagne, Brookfield, all of Conn.

[73] Assignee: The Perkin-Elmer Corporation, Norwalk, Conn.

[21] Appl. No.: 22,910

[22] Filed: Mar. 6, 1987

[51] Int. Cl.[4] .................... B23K 9/00

[52] U.S. Cl. .................... 219/121.52; 315/111.51; 356/316; 219/121.48; 219/121.54; 219/121.57; 219/121.59

[58] Field of Search .................... 219/121 PR, 121 PM, 219/121 PN, 121 PQ, 121 PG, 75, 121 PW, 121 PT; 313/231.31, 231.41, 231.51; 315/111.51; 356/311, 316

[56] References Cited

U.S. PATENT DOCUMENTS

| | | | |
|---|---|---|---|
| Re. 29,304 | 7/1977 | Greenfield et al. | 219/121 PR |
| 3,296,410 | 1/1967 | Hedger | 219/121 PR |
| 3,324,334 | 6/1967 | Reed | 219/121 PR |
| 3,648,015 | 3/1972 | Fairbairn | 219/121 PR |
| 4,266,113 | 5/1981 | Denton et al. | 219/121 PQ |
| 4,306,175 | 12/1981 | Schleicher et al. | 315/111.51 |
| 4,482,246 | 11/1984 | Meyer et al. | 356/316 |
| 4,575,609 | 3/1986 | Fassel et al. | 315/111.51 |
| 4,578,560 | 3/1986 | Tanaka et al. | 219/121 PR |
| 4,629,940 | 12/1986 | Gagne et al. | 315/111.51 |

*Primary Examiner*—M. H. Paschall
*Attorney, Agent, or Firm*—H. S. Ingham; F. L. Masselle; E. T. Grimes

[57] ABSTRACT

An induction plasma system comprises a torch and an induction coil. A sample substance is injected into the plasma at an axial position that is adjustable while the plasma is being energized. The plasma-forming gas flows through the induction coil prior to passing through the plasma torch. A piezoelectric crystal is used for initiating the plasma. An oscillator network generates radio frequency power at a first frequency, and an output LC network that includes the induction coil is tuned to a second frequency higher than the first frequency. Means for maintaining constant power to the plasma includes an AC circuit for duty cycling AC power input to a DC power supply in response to a feedback signal relative to the rectified voltage. Thus a change in the rectified voltage effects an inverse change in the duty cycling such as to nullify the change in the rectified voltage.

11 Claims, 4 Drawing Sheets

INDUCTIVELY COUPLED PLASMA TORCH WITH ADJUSTABLE SAMPLE INJECTOR

The present invention relates generally to the field of inductively coupled plasma torches and more particularly to a plasma torch and an associated power supply system for improved operation of the plasma.

BACKGROUND OF THE INVENTION

In typical inductively coupled plasma ("ICP") systems a strong radio frequency field is generated by an induction coil and energizes a gas as a plasma discharge in a torch device. Such plasma systems are typically used for spectroscopy, treatment of fine powders, melting of materials, chemical reactions and the like. These applications derive from the high temperatures inherently associated with a plasma, e.g., on the order of about 9000 degrees Centigrade.

The gases necessary to sustain an ICP discharge are commonly introduced into a torch constructed of a quartz tube which partially contains the high temperature plasma. In such a torch the tube surrounds the discharge to shape the plasma which is maintained by the radio frequency field created by the induction coil encircling the quartz tube.

U.S. Pat. Nos. Re. 29,304 and 4,266,113 illustrate typical ICP torches that may be used for spectroscopy, comprising three concentric tubes. The plasma-forming gas is passed through the annular space between the innermost tube and the middle tube. The innermost tube, or pipe, terminates near the plasma region and is used for a carrier gas containing the sample substance being injected into the plasma. A cooling gas for the tube assembly, which may be the same type or a different gas than for the plasma, flows between the outermost tube and the middle tube.

The induction coil is typically formed of copper tubing and is generally water cooled.

As indicated in the above-identified patents the torch assembly is fixed with respect to the induction coil so that the sample substance is injected axially near the rear end of the coil; i.e., the lower end of the coil in a vertical configuration with the plasma issuing upwards. U.S. Pat. No. 4,578,560 discloses the use of flanges on the bottom ends of the tubes which connect to corresponding flanges of lower mounts. Spacers are placed between the connecting flanges to provide adjustment of the tubes during assembly, fixing the positions for operation.

Generally the plasma discharge must be initiated by a starter device. U.S. Pat. No. 3,324,334 mentions a high energy spark source (at column 5, line 46) but provides no details. In U.S. Pat. No. 3,296,410 a tap from the radio frequency generator is disclosed (FIG. 2 of the referenced patent), but in practice this has not been very reliable for starting. U.S. Pat. No. 4,482,246 teaches the use of a Tesla coil which is relatively expensive. A lower cost device is disclosed in aforementioned U.S. Pat. No. Re. 29,304 whereby a carbon rod is introduced into the open end of the torch where it is heated by the radio frequency field, in turn heating the gas to initiate the plasma (column 5, lines 15–20); however, this device also has proven to be unreliable.

Another problem associated with ICP systems is tuning the radio frequency. A typical circuit is shown in the U.S. Pat. No. Re. 29,304 patent (FIG. 2). The main oscillator is a "tank" circuit, i.e., an LC circuit, in combination with a vacuum triode tube having a DC power supply on the plate. A second LC circuit includes the induction coil for the ICP, that coil also providing at least part of the induction for the second LC circuit. Coupling between the circuits is either inductive or capacitive. The two circuits are tuned to similar frequencies to obtain transfer of power.

As indicated in aforementioned U.S. Pat. No. 3,296,410 there is a certain amount of coupling between the plasma and the associated induction coil, the coupling resulting in changes in the frequency (column 4, lines 17–26). The changes may occur as the plasma gases change, for example when the sample substance is injected into the plasma. The result is inefficient transfer of radio frequency power from the main oscillator to the second LC circuit and thus to the ICP. The U.S. Pat. No. 3,296,410 patent attempts to solve this by a further inductance in the second circuit, but such an approach clearly does not resolve the problem and either a compromise frequency is chosen or retuning is required during operation.

U.S. Pat. No. 4,629,940 shows the utilization of variable capacitance for returning in which the retuning is done automatically by servomechanisms through feedback circuitry. Although such a system has been quite successful, it generally is cumbersome, expensive, and prone to malfunction.

The ICP is to be distinguished from a different type of radio frequency plasma generator as disclosed, for example, in U.S. Pat. No. 3,648,015, in which the plasma is generated capacitively. A metallic nozzle assembly is attached to the output coil and the plasma is generated from the tip of the nozzle. The plasma-forming gas is provided to the nozzle through its connection to the coil which is formed of piping. The gas and a powder are introduced into the coil pipe at another connection point.

In view of the foregoing a primary object of the present invention is to provide a novel induction plasma system having improved reliability of ignition and maintenance of a stable, properly formed plasma discharge.

Another object is to provide a novel induction plasma torch having a means for injecting sample substance at an adjustable position in the plasma.

A further object is to provide novel means for constant power input to an induction plasma torch under changing operating conditions.

BRIEF DESCRIPTION OF THE INVENTION

The foregoing and other objects of the present invention are accomplished by an induction plasma generating system comprising a tubular torch member formed of electrically insulating heat-resistant material, means for passing plasma-forming gas through the torch member in a forward direction, a helical induction coil with an axis, disposed outside of and substantially concentrically with the torch member so as to energize the gas as a plasma discharge in a plasma region in the torch member, injection means for injecting a sample substance into the gas in the torch member and adjusting means for adjusting the position of the injection means in an axial direction with respect to the induction coil while the gas is being energized.

The adjusting means includes means for varying the position of the injection means between a first location and a second location, the first location being proximate a first plane that is oriented perpendicularly to the axis of the induction coil in contact with the forward edge of the induction coil, and the second location being proximate a second plane that is oriented perpendicularly to the axis of the induction coil in contact with the rearward edge of the coil. Preferably the system includes means for initiating the plasma discharge while the injection means is positioned at the first location, and the adjusting means then relocates the injection means from the first location to the second location after the plasma discharge is initiated.

Also, means are provided for flowing the gas through the conductive tubing prior to passing the gas through the tubular member so as to cool the induction coil and preheat the gas.

Another embodiment includes means for initiating the plasma, comprising a high-voltage conductor extending to the plasma-forming gas in the tubular member proximate the plasma region, a piezoelectric crystal electrically connected to the conductor and mechanical means for energizing the piezoelectric crystal to generate a high voltage pulse therefrom, thereby creating a spark in the plasma-generating gas.

Preferably the system includes means for maintaining constant power to the plasma discharge. Such means comprises a radio frequency generator including the output LC network and the oscillator network that includes a power triode with a plate and being coupled to the output LC network. A DC power supply for effecting a rectified voltage to the triode plate includes an input transformer with a primary winding receptive of AC power. An AC circuit receptive of line voltage for effecting the AC power includes means for duty cycling the AC poer in response to a control signal, feedback means for generating a feedback signal relative to the rectified voltage, and control means receptive of the feedback signal for producing the control signal such that a change in the rectified voltage effects an inverse change in the duty cycling such as to nullify the change in the rectified voltage.

DETAILED DESCRIPTION OF THE INVENTION

Figure 1:
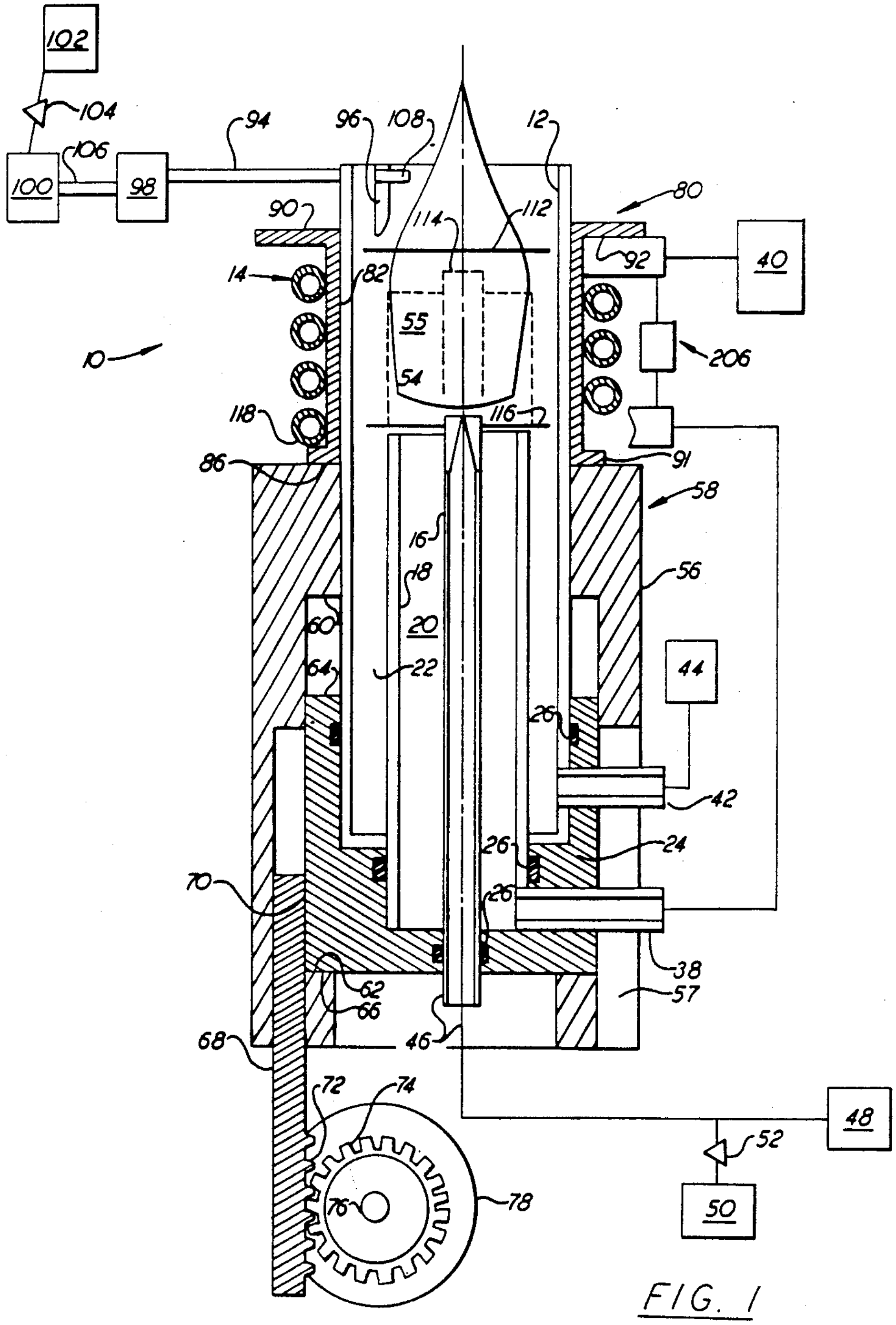
FIG. 1 is a side view in vertical section of a torch with induction coil according to the present invention.

Referring to FIG. 1, which shows a plasma torch 10 according to the present invention, a tubular torch member 12 is formed of quartz or other electrically insulating material. A helical induction coil 14 having about three and one half turns is shaped from copper tubing and encircles the upper part of the torch member generally concentrically therewith. A small diameter pipe 16 of similar material or preferably alumina is positioned along the axis of the torch, terminating in the vicinity of coil 14 as will be described in detail below. A tubular intermediate member 18, preferably of the same composition as the torch member, is located concentrically between torch member 12 and pipe 16, forming an inner annular space 20 outside pipe 16 and a second relatively thin outer annular space 22 inside torch member 12. Intermediate member 18 terminates at about the rearward edge of coil 14.

(As used herein and in the claims, "forward" and terms derived therefrom or synonymous or analogous thereto, have reference to the end toward which the plasma flame issues from the gun; similarly "rearward" etc. denote the opposite location.)

Torch member 12, intermediate member 18 and pipe 16 are affixed concentrically with respect to each other in a mounting member 24 with O-rings 26.

A first conduit 38 for conveying plasma-forming gas from a source 40 into inner annular space 20, by way of the piping of coil 14 is connected to the lower part of intermediate member 18 and extend laterally therefrom. The plasma-forming gas thus flows in a forward direction with respect to torch 10; i.e., upwardly in the orientation shown in the present example.

A second conduit 42 for cooling gas from a source 44 is similarly connected to torch member 12. The sources 40, 42 optionally may be the same single source. The plasma-forming gas is preferably argon but may be any other desired gas such as nitrogen, helium, hydrogen, oxygen, hydrocarbon, air, or the like.

Flowing the plasma-forming gas through the tubing of coil 14 was found to have the benefits of cooling the coil and preheating the gas. Surprisingly sufficient cooling was obtained even at and above 1 KW applied RF power. Preheating results in less of a thermal gradient through the system with improved stability resulting.

The bottom end of the central pipe 16 protrudes downwardly through mounting member 24 and is attached through a third conduit 46 to a source of carrier gas 48. A sample of substance from a sample container 50 to be introduced into the plasma is fed into the carrier gas flow through a valve 52 from a source of the sample or material, in liquid or powder form. Such substance may be for spectrographic analysis or other treatment by the plasma as desired. Alternatively the carrier gas itself may be the sample. The fluidized sample is thus conveyed upwardly (forwardly) through an orifice 54 in pipe 16 and injected into a plasma region 55 generated within induction coil 14 and torch member 12.

Mounting member 24 is slidingly retained in a torch body 56 such that the mounting member and its assembly 58 of torch member 12, intermediate member 18 and pipe 16 can be moved vertically. An upper shoulder 60 and a lower shoulder 62 are provided in torch body 56 to engage respective upper and lower end surfaces 64,66 of mounting member 24 to position the mounting member in an upper (forward) position or lower (rearward) position respectively; the lower position of mounting member 24 is shown in FIG. 1. A vertical slot 57 in torch body 56 accommodates movement of the gas conduits 38,42.

A vertical strut 68 is attached to a side 70 of mounting member 24 and extends down beyond torch body 56. A set of teeth 72 arranged vertically is cut into the strut 68 to form a rack. A pinion gear 74 engaging teeth 72 is mounted on a shaft 76 to which a control knob 78 also is mounted. Thus turning of the control knob, by hand, motor, pulley belt or the like (not shown), causes strut 68, mounting member 24 and tube assembly 58 to move vertically between the shoulder limits 60,62. Mounting member 24 may be moved by any other desired means, such as a stepper motor.

More reliable ignition of a stable, properly-formed plasma discharge is obtained by vertical position adjustability of the quartz torch. Proper aerodynamic flow at the load coil location is assured so that destructive ring discharges are unable to form during ignition. The adjustment then locates the injector tip at, or close to, the lower location where the plasma forms, which greatly simplifies formation of a sample channel axially through the plasma, and when the sample is subsequently injected it is restricted from circumventing the plasma region.

Induction coil 14 is retained on a tubular mount 80 formed of a cylindrical section 82 on which the coil is positioned snugly. Tubular mount 80 has an anxial length that is enough greater than that of coil 14 so as to extend the mount to a contact surface 86 on torch body 56 to position coil 14 with respect to body 56. A retainer holds the mount in position. Preferably the tubular mount also has an upper flange 90 extending radially outwardly from cylindrical section 82 at the top (forward end) thereof. The upper flange has an outer diameter greater than the outer diameter of coil 14 and is adjacent to the forward edge 92 of the coil, so as to provide a radio frequency barrier between the coil and the open end of the torch. Coil 14 is positioned vertically between upper flange 90 and a lower flange 91.

Continuing with FIG. 1, an elecrically conductive probe 94 is extended through a slot 96 in the forward end of the torch member 12. The probe is electrically connected to the high voltage output of a piezoelectric crystal 98 capable of yielding a pulse of at least 10 kilovolts, for example about 20 kilovolts. A pneumatic piston assembly 100 is supplied by a source 102 of compressed gas through a valve 104 and is connected mechanically to the crystal by a rod 106. When the valve is opened a mechanical pulse from the rod to the crystal results in a very high voltage pulse that triggers a spark from the tip 108 of probe 94 at the torch. The plasma is initiated by first applying the radio frequency power to the induction coil and then pulsing the crystal. Pulsing may be repeated as necessary at a higher repetition time than the full recovery cycle time of the piezoelectric crystal, allowing creation of sufficient ionized gas intermittantly to cause ignition as if a continuously ionized stream was being produced. Starting the plasma discharge in this manner has been found to be highly reliable and the piezoelectric crystal system has a relatively low cost compared to prior reliable starters.

The plasma discharge is thus formed in the torch member in plasma region generally within the induction coil. According to the present invention the injector pipe, and preferably the entire torch assembly is adjusted axially with respect to the induction coil while the plasma discharge is energized. In particular, it was found advantageous to start the plasma while the orifice of the injector pipe is positioned proximate a hypothetical plane 112 that is oriented perpendicularly to the axis 114 of the induction coil in contact with the forward edge of the coil. Such position of the pipe is shown by broken lines 114 in FIG. 1. After the plasma is started the injector tip is withdrawn to a second position, which is that shown in the figure, proximate a second plane 116 that is oriented perpendicularly to the axis of the coil in contact with the rearward edge 118 of the coil.

Figure 2:
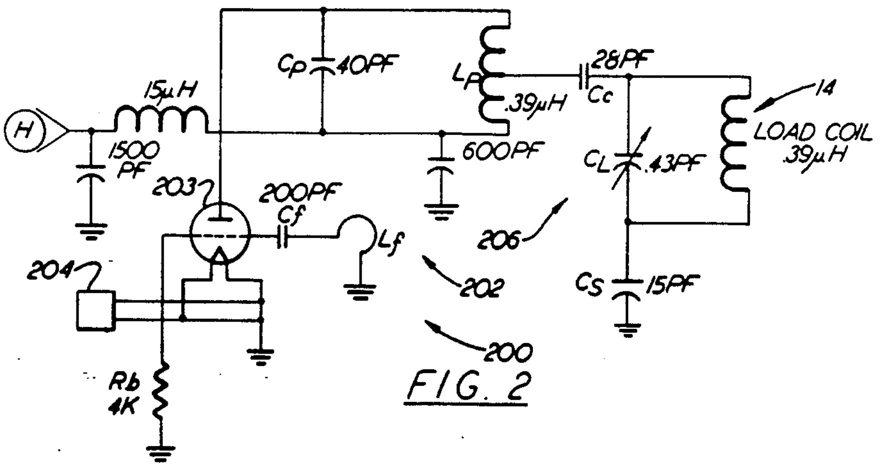
FIG. 2 is a schematic of the oscillator network circuit of the present invention.

The radio frequency (RF) system 200, shown in FIG. 2, is a 40 MHZ tuned power oscillator, capacitively coupled to a high Q tuned output netork which powers the inductively coupled plasma. The frequency generally should be between about 20 MHZ and 90 MHZ, preferably between 30 MHZ and 50 MHZ, for example 40 MHZ. An oscillator network 202 comprises a power triode amplifier 203 with a filament circuit 204, a feedback and grid leak biasing circuit of inductance Lf, capacitance Cf and resistance Rb, and a tuned plate circuit coil Lp and capacitance Cp. The output of oscillator 204 is capacitively coupled through Cc to the output network 204 comprising capacitance CL; such capacitive coupling Cc is preferable over inductive coupling due to lower impedance and undesirable effects of heating. Output network load coil 14 is used to inductively couple the RF power to the plasma.

Coil Lp is conventionally formed of metal sheet which also intrinsically provides the capacitance Cp. The coupling capacitor Cc between the oscillator and the output network is also formed of metal sheet proximate Lp/Cc, shown schematically in FIG. 2 as a tap coming off of coil LP. A tunable capacitor Cl is used to tune the circuit and comprises a third metal sheet variable in position. Once this is adjusted upon assembly of the system it need not be changed again. A capacitance Cs is stray capacitance formed by the proximity of the output network to its grounded enclosure, and is the RF return for load coil 14.

According to the present invention, output LC network 206 is tuned without sample injection of the higher frequency than oscillator network 202, thereby allowing only a predetermined fraction of the oscillator power to be coupled through Cc to the output network and hence to the plasma. During plasma generation the frequency difference between the frequencies of oscillator network 202 and output network should be between 0.1 MHZ and 2 MHZ.

Typically the frequency difference drops from about 1 MHZ for plasma without sample injection to about 0.4 MHZ as a sample is injected into the plasma. The frequency of network 206 may even approach the same value as for oscillator 202 with certain sample introductions but may not be a lesser frequency due to instability. When a sample is atomized and injected into the plasma, the flow pattern and composition is changed, causing unfavorable conditions for sustaining the plasma, and the reactive coupling coefficient of the coil 14 is thereby altered to increase its apparent inductance. This decreases the resonant frequency of the output network to a value that is closer to the frequency of the oscillator, thereby coupling more power to the output network and hence stabilizing the plasma.

The level of power dissipated by the plasma is a function of the coupling coefficient of the load coil to the plasma which is sample dependent, while the power delivered to the plasma for a given sample condition is tightly regulated by the high voltage plate regulation of power triode 203. The plate voltage of power triode 203 will determine the RF output power delivered to the plasma.

Preferably the operating power is held constant throughout the changes in coupling between the coil and the plasma. According to a preferred embodiment of the present invention, this is accomplished by means of a feedback network involving sampling the DC plate voltage and varying the fractional size of each of the applied half cycles of AC power supplied to the high voltage transformer primary. This phase control (duty cycle) regulation allows the plate voltage to be adjustable from a few hundred volts to 4.5 KV DC and to be held constant over large line voltage transitions. With the plate voltage set to 3 KV and 75% of max loading, the regulation for the system described hereinbelow was found to be better than 1% when the line voltage was varied from 190 VAC to 256 VAC.

Figure 3:
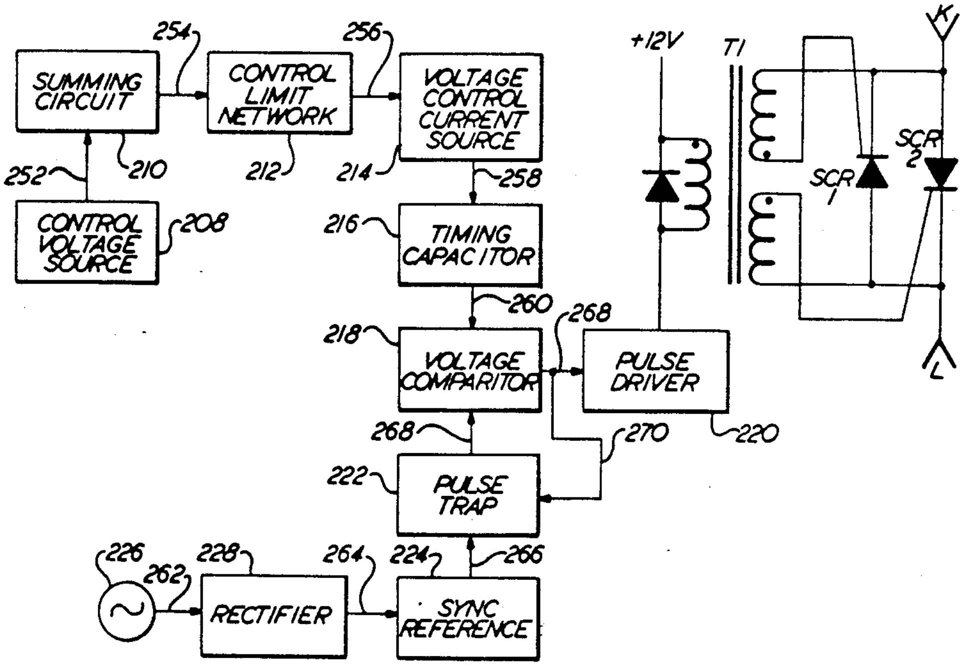
FIG. 3 is a block diagram of a feedback network circuit according to the present invention.
Figure 4:
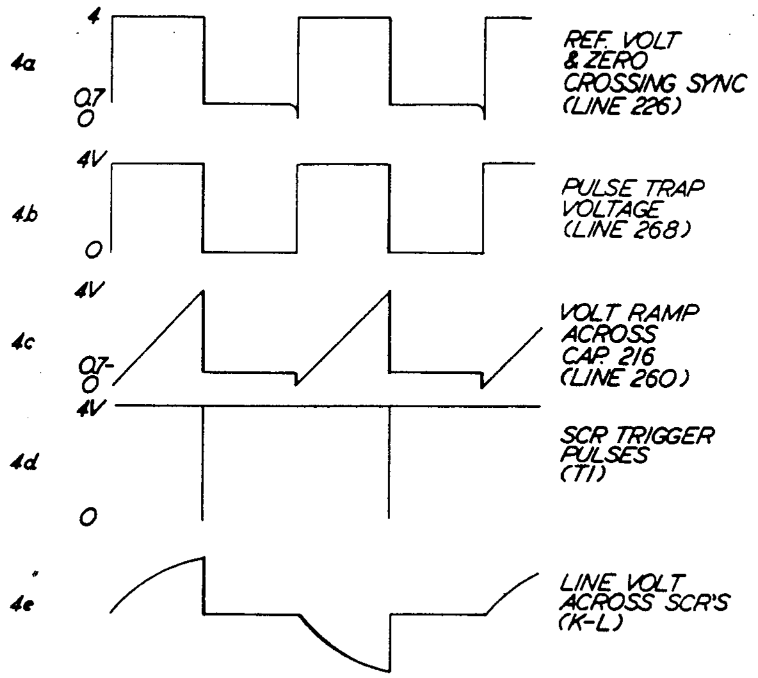
FIGS. 4*a*–4*e* are graphs of the signals of various points in the circuit of FIG. 3.

The operation of the phase control regulator can be seen with the aid of block diagram FIG. 3 and the wave forms shown in FIG. 4. An accuratly controlled DC voltage is provided by a control voltage source 208 and fed through line 252 to a summing circuit 210. A feedback signal proportional to the plate voltage of triode 203 enters circuit 210 where it is summed with the control voltage to generate an error voltage. The error voltage is applied through line 254, a control limit network 212 and line 256 to a voltage control current source 214 which provides a constant source of current proportional to the error voltage. The current from line 258 charges a timing capacitor 216, which charges linearly as shown in FIG. 4*b*, because of the constant current supply, at a rate that is determined by the magnitude of the current and, therefore, by the error voltage. The voltage on timing capacitor 216 is sensed on line 260 by a voltage comparator 218.

A synchronizing reference 224 is driven by the start of each half cycle of line voltage source 226 obtained through line 262, a non-filtering full wave rectifier 228 and line 264. Reference 224 generates zero-crossing pulses synchronized by the line voltage. These pulses, indicated in FIG. 4*a*, are fed through line 266 to pulse trap 222, which is reset by each pulse.

When the input voltage to voltage comparator 218 reaches a predetermined voltage, the comparator discharges timing capacitor 216 into a pulse driver 220, via line 268, which provides a trigger pulse (FIG. 4*d*) on its output line 272. The discharge of comparator 218 also fires, via line 270, a pulse trap 222 which has been reset earlier in the cycle by the zero crossing pulses from line 266. The output of pulse trap 222 on line 268 is in the form of a square pulse (FIG. 4*b*) having a duration extending from the zero crossing (reset) to a time in the cycle established by the discharge timer 216 through voltage comparator 218. The initial firing of pulse trap 222 unleashes voltage comparator 218 to allow timing capacitor 216 to start its charging cycle (FIG. 4*c*). By allowing timing capacitor 216 to always start its timing cycle referenced to the zero-crossing synchronized pulse, the regulator will always be in synchronization with the line.

The pulse driver 220 drives a 1:1:1 pulse transformer T1 which determines the firing angle of each of a parallel pair of silicon control rectifiers SCR1, SCR2. These control rectifiers SCR1, SCR2 are in series with the AC power source to the DC power supply, as will be described below. Thus the firing angle and, therefore, the duty cycle (FIG. 4*e*) of these control rectifiers determine the AC voltage input to the high voltage DC power supply and, therefore, the DC voltage applied to oscillator circuit 202 (FIG. 2). As the duty cycle is established inversly to the plate voltage of triode 203, any potential change initiated, for example, by a change in the plasma torch load or in the AC power supply, is caused to be nullified by an inverse change in the duty cycling provided by the control rectifiers.

Figure 5:
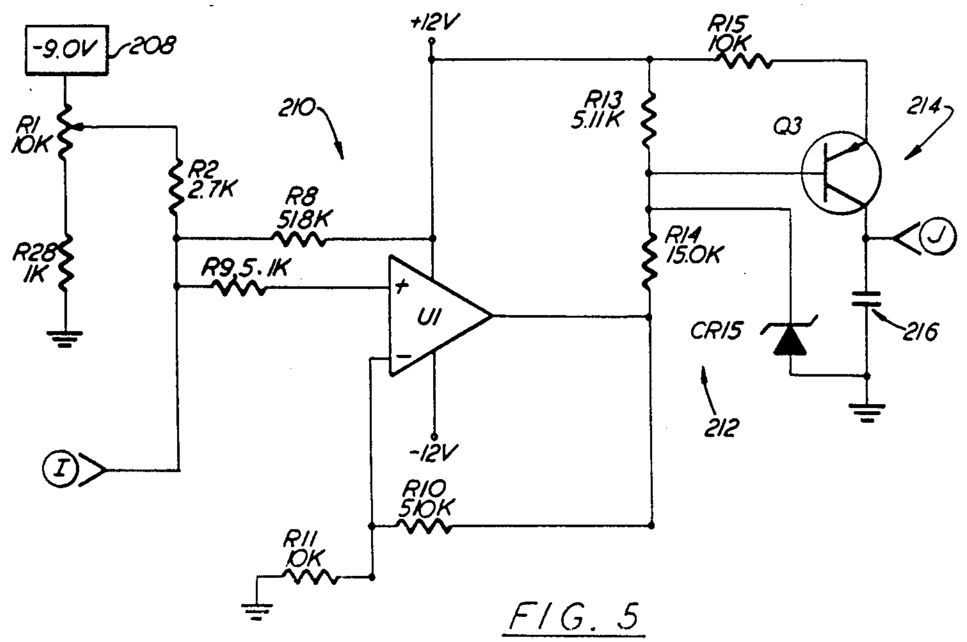
FIGS. 5–7 are circuit diagrams of certain elements of FIG. 3.
Figure 6:
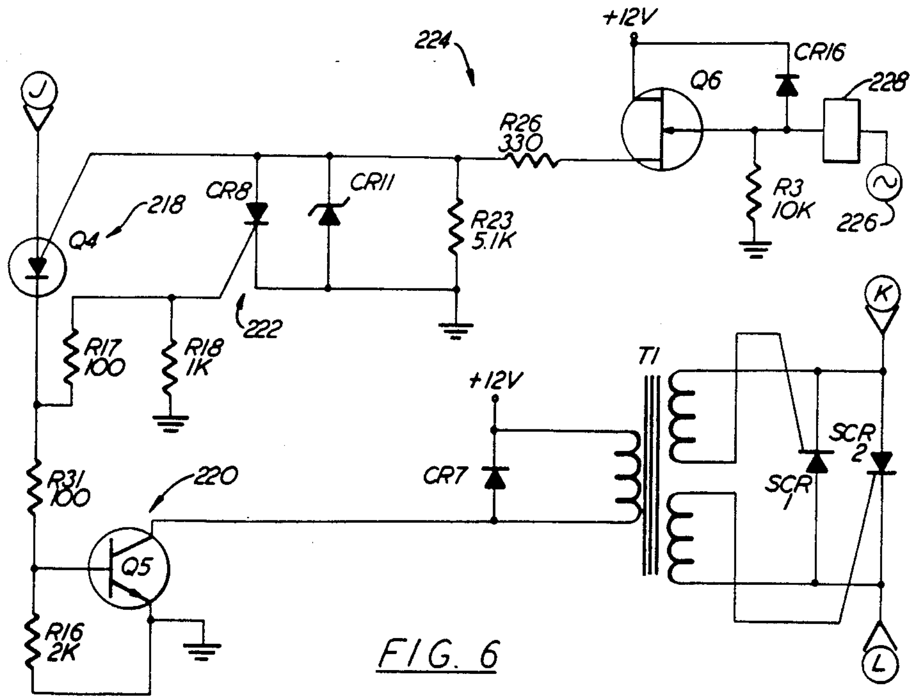

As examples, certain circuit details and preferred embodiments of the phase control regulator are provided in FIGS. 5–6. With reference to FIG. 5, a feedback signal proportional to the plate voltage of triode 203 enters summing circuit 210 at connection I and is summed with a control voltage of −9.0 volts by operational amplifier U1 to generate an error voltage. The response speed of the phase control regulator is determined by this amplifier; desirably its gain is 34 db with a breakpoint of 2 Hz with the gain decreasing 20 db/decade and reaching 0 db at 50 Hz.

The error voltage from U1 is supplied through control limit network 212 comprising resistors R13, R14 and zener dioce CR15 to voltage controlled current source 214 comprising transistor Q3. A timing capacitor 216 is charged linearly by Q3 output because of the constant current supply.

The voltage on timing capacitor 216 is sensed via connection J by voltage comparator 218 comprising Q4, FIG. 6, which is a programable unijunction transistor. When the anode voltage of Q4 charges to 0.2 V less than the gate voltage, Q4 fires and discharges capacitor 216 (from connection J) through resistor R31 into the base of pulse driver 220 comprising transistor Q5. The pulse generated by Q4 also fires pulse trap 222 comprising control rectifier CR8 which, through resistor R17, clamps the gate of Q4 to 0.7 V and prevents it from refiring and also prevents timer 216 from recharging.

Pulses to timing capacitor Q4 are synchronized with a synchronizing reference 224 (FIG. 6) comprising a buffer field effect transistor Q6 and zener diode CR11. A line voltage 226 is rectified by a full wave rectifier 228 and fed to the gate of Q6 which, in conjunction with diode CR11, produces zero-crossing pulses (FIG. 4*a*) of one each half cycle. That buffered signal is limited to 3.9 volts through diode CR11 producing a very clipped pulse with spikes going to ground during zero crossing transients. The zero-crossing sync pulse resets pulse trap CR8 and unlatches Q4 which allows capacitor 216 to start its charging cycle.

The upper and lower control limit circuit 212 (FIG. 5) which comprises resistors R13, R14, and diode CR15 is used to insure that when the regulator is set to the minimum DC output voltage SCR1 and SCR2 fire every half cycle to prevent an imbalance in the transformer; or, when set to maximum DC voltage, that the SCR's are not turned off prematurely due to the small voltage to current phase shift caused by the inductance of the transformer. The maximum inductive phase shift is 14.4° and the minimum delay limit is 27°, the maximum delay limit is 162°. Resistor R8 to U1 in circuit 210 is used to keep the error voltage high, and Q3 at minimum charging current, to initialize a starting point when both the high voltage and the control voltage are off.

The pulse driver, Q5, drives pulse transformer T1 which triggers silicon control rectifiers SCR1, SCR2. These are rated at 35 amperes continuous at 800 V peak.

Figure 7:
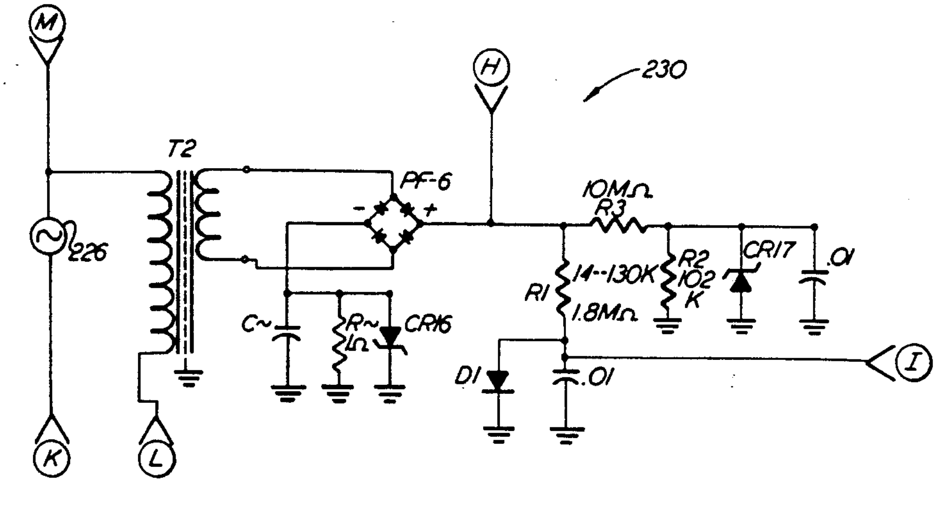

A high DC voltage supply 230, shown in FIG. 7, takes 4,000 volts AC off of the secondary winding high voltage transformer T2 to a full wave rectifier bridge PF6. The network includes a large external capacitor CR of 6 microfarads. Metering resistors R1, R2, R3 include a voltage divider for suitable level of feedback voltage. The plate voltage of tube 203 (FIG. 2) is supplied via connection H through choke T3. The feedback voltage of about 0.4 volts is taken between resistor R1 and diode D1 and fed through connection I to the summing circuit 210 (FIG. 5).

As indicated hereinabove, the maintenance of a constant power level to the plasma for the duration of each run with a specific test sample is especially desirable while the sample substance is being injected into the plasma. However, the power level may be different for different samples.

While the invention has been described above in detail with reference to specific embodiments, various changes and modifications which fall within the spirit of the invention and scope of the appended claims will become apparent to those skilled in this art. The invention is therefore only intended to be limited by the appended claims or thier equivalents.

What is claimed is:

1. An induction plasma generating system comprising:

a tubular torch member formed of electrically insulating heat resistant material;

means for passing plasma-forming gas through the torch member in a forward direction;

a helical induction coil with an axis, a forward edge and a rearward edge, disposed outside of and substantially concentrically with a torch member so as to energize the gas as a plasma discharge in a plasma region in the torch member;

injection means for injecting a sample substance into the gas in the torch member;

adjusting means for adjusting the position of the injection means in an axial direction with respect to the induction coil while the gas is being energized, including means for varying the position of the injection means between a first location and a second location, the first location being proximate a first plane that is oriented perpendicularly to the axis of the induction coil in contact with the forward edge of the induction coil, and the second location being proximate a second plane that is oriented perpendicularly to the axis of the induction coil in contact with the rearward edge of the coil; and means for initiating the plasma discharge while the injection means is positioned at the first location, the adjusting means further including means for relocating the injection means from the first location to the second location after the plasma discharge is initiated.

2. An induction plasma generating system according to claim 1 wherein the torch member has an axis, and the plasma generating system further comprising a ceramic pipe mounted coaxially within the torch member and means for passing the sample substance in fluid form forwardly through the ceramic pipe, the pipe having a forward end with an orifice therein defining the injection means.

3. An induction plasma generating system according to claim 2 further comprising a torch assembly that comprises the torch member and the ceramic pipe, wherein the ceramic pipe is affixed with respect to the torch member, and the adjusting means further includes means for moving the torch assembly axially with respect to the induction coil.

4. An induction plasma generating system according to claim 3 wherein the torch assembly further comprises:

a tubular inner member formed of electrically insulating heat resistant material mounted coaxially between the torch member and the pipe and extending to a third plane that is oriented perpendicularly to the axis of the torch member proximate the forward end of the pipe, the torch member and the inner member cooperating to define an outer annular space, and the inner member and the pipe cooperating to define an inner annular space; and a mounting member for securing in sealing relationship the torch member, inner member and pipe, having a first duct to introduce the plasma-forming gas into the inner annular space and a second duct to introduce a cooling gas into the inner annular space wherein the adjusting means engages the mounting member to vary the position of the mounting member.

5. An induction plasma generating system according to claim 1 further comprising means for initiating the plasma, wherein the initiating means comprises a high-voltage conductor extending to the plasma-forming gas in the tubular member, a piezoelectric crystal electrically connected to the conductor and mechanical means for energizing the piezoelectric crystal to generate a high voltage pulse therefrom, thereby creating a spark in the plasma-forming gas.

6. An induction plasma generating system according to claim 1 wherein the induction coil is formed of conductive tubing and the induction plasma generating system further comprises means for flowing the gas through the conductive tubing prior to passing the gas through the tubular member so as to cool the induction coil and preheat the gas.

7. An induction plasma generating system according to claim 1 further comprising means for maintaining constant power to the plasma discharge.

8. An induction plasma generating system according to claim 7 wherein the means for maintaining constant power comprises:

a radio frequency generator including the output LC network and a power triode with a plate and being coupled to the output LC network, a DC power supply for effecting a rectified voltage to the triode plate including an input transformer with a primary winding receptive of AC power, an AC circuit receptive of line voltage for effecting the AC power including means for duty cycling the AC power in response to a control signal, feedback means for generating a feedback signal relative to the rectified voltage, and control means receptive of the feedback signal for producing the control signal such that a change in the rectified voltage effects an inverse change in the duty cycling such as to nullify the change in the rectified voltage.

9. An induction plasma generating system according to claim 8 wherein the control rectifier comprises a silicon control rectifier with a firing angle corresponding to the duty cycling, and the control means comprises current means for effecting a timing current relative to the feedback signal, a timing capacitor receptive of the timing current such as to charge the timing capacitor, synchronizing means receptive of the AC power to initiate charging of the timing capacitor at a preselected phase of AC power cycle, comparator means for discharging the timing capacitor to produce a discharge pulse when the timing capacitor reaches a preselected voltage, and means receptive of the discharge pulse for effecting control pulses constituting the control signal, the firing angle being responsive to the control pulses.

10. An induction plasma generating system comprising:

a tubular torch member having an axis and being formed of electrically insulating heat-resistant material;

means for passing plasma-forming gas through the torch member in a forward direction;

a helical induction coil with an axis, a forward edge and a rearward edge, disposed outside of and substantially concentrically with the torch member so as to energize the gas as a plasma discharge in a plasma region in the torch member;

injection means for injecting a sample substance into the gas in the torch member, comprising a ceramic pipe having a forward orifice end with an orifice therein mounted coaxially within the torch member and means for passing the sample substance in fluid form forwardly through the orifice;

a tooth assembly including the torch member and the ceramic pipe, the ceramic pipe being affixed with respect to the torch member;

adjusting means for adjusting the position of the torch assembly in an axial direction with respect to the induction coil while the gas is being energized, including means for varying the position of the orifice end between a first location and a second location, the first location being proximate a first plane that is oriented perpendicularly to the axis of the induction coil in contact with the forward edge of the induction coil, and the second location being proximate a second plane that is oriented perpendicularly to the axis of the induction coil in contact with the rearward edge of the coil;

means for initiating the plasma discharge while the orifice end is positioned at the first location, the adjusting means further including means for relocating the orifice end from the first location to the second location after the plasma discharge is initiated.

11. A plasma generating method for use with an induction plasma generating system having a tubular torch member formed of electrically insulating heat resistant material, a helical induction coil disposed outside of and substantially concentrically with the torch member, and injection means for injecting a sample substance into the gas in the torch member, the induction coil having an axis, a forward edge and a rearward edge, the method comprising:

positioning the injection means at a first location proximate a first plane that is oriented perpendicularly to the axis of the induction coil in contact with the forward edge of the induction coil;

initiating a flow of plasma-forming gas through the torch member in a forward direction;

energizing the flowing gas as a plasma discharge in a plasma region in the torch member by means of the induction coil; and while the flowing gas is being energized, adjusting the position of the injection means in an axial direction with respect to the induction coil from the first location to a second location proximate a second plane that is oriented perpendicularly to the axis of the induction coil in contact with the rearward edge of the coil.

* * * * *

UNITED STATES PATENT AND TRADEMARK OFFICE
CERTIFICATE OF CORRECTION

PATENT NO. : 4,766,287

DATED : August 23, 1988

INVENTOR(S) : Peter J. Morrisroe, Andrew T. Zander, David C. Manning and Peter H. Gagne It is certified that error appears in the above-identified patent and that said Letters Patent is hereby corrected as shown below:

Column 11, Line 12, change "tooth" to --torch--.

Signed and Sealed this

Fourth Day of July, 1989

*Attest:*

DONALD J. QUIGG

*Attesting Officer* *Commissioner of Patents and Trademarks*